United States Patent
Kawaki et al.

Patent Number: 5,321,097
Date of Patent: Jun. 14, 1994

[54] HEAT-RESISTANT RESIN COMPOSITION

[75] Inventors: Takao Kawaki; Akikazu Amagai, both of Tokyo; Masahiko Ishikawa, Tsukuba; Toshiaki Yamada, Tsukuba; Yasuhiro Hirai, Tsukuba; Hajime Ban, Tsukuba, all of Japan

[73] Assignee: Mitsubishi Gas Chemical Company, Inc., Tokyo, Japan

[21] Appl. No.: 54,194

[22] Filed: Apr. 30, 1993

Related U.S. Application Data

[63] Continuation-in-part of Ser. No. 804,915, Dec. 11, 1991, abandoned.

[30] Foreign Application Priority Data

Dec. 20, 1990 [JP] Japan ................................. 2-411822
Feb. 15, 1991 [JP] Japan ................................. 3-42240

[51] Int. Cl.$^5$ ...................... C08L 81/04; C08L 79/08
[52] U.S. Cl. .................................... 525/424; 525/537
[58] Field of Search ............................. 525/424, 537

[56] References Cited

U.S. PATENT DOCUMENTS

| | | | |
|---|---|---|---|
| 4,017,555 | 4/1977 | Alvarez | 260/857 |
| 4,340,697 | 7/1982 | Aya et al. | 525/537 |
| 5,015,703 | 5/1991 | Takekoshi et al. | 525/537 |
| 5,028,656 | 7/1991 | Okabe et al. | 525/537 |
| 5,149,749 | 9/1992 | Blackwell et al. | 525/537 |
| 5,219,657 | 6/1993 | Ueoka et al. | 525/424 |

FOREIGN PATENT DOCUMENTS

| | | |
|---|---|---|
| 184592 | 6/1986 | European Pat. Off. |
| 223958 | 6/1987 | European Pat. Off. |
| 365877 | 5/1990 | European Pat. Off. |

OTHER PUBLICATIONS

Patent Abstracts of Japan, vol. 6, No. 257 (1982) JP-A-57151647.
Patent Abstracts of Japan, vol. 6, No. 257 (1982) JP-A-57151648.

*Primary Examiner*—John C. Bleutge
*Assistant Examiner*—Helen F. Lee
*Attorney, Agent, or Firm*—Wenderoth, Lind & Ponack

[57] ABSTRACT

A heat-resistant resin composition comprising a melt-kneaded product of:

(A) at least one member selected from the group consisting of a polyamideimide resin precursor composed mainly of a recurring unit of the formula (1)-a,

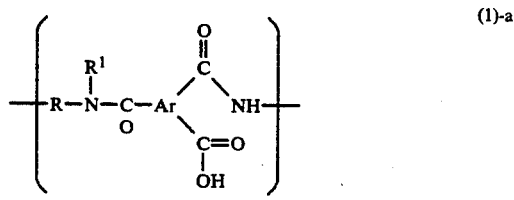

wherein R is a divalent aromatic group or aliphatic group, R$^1$ is a hydrogen atom, an alkyl group or a phenyl group, and Ar is a trivalent aromatic group composed of at least one six-membered ring, and a polyamideimide resin composed mainly of a recurring unit of the formula (1)-b,

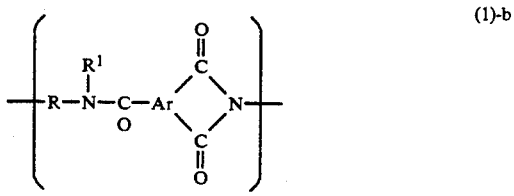

wherein R, R$^1$ and Ar are as defined in the above formula (1)-a, (B) a polyphenylene sulfide resin, and (C) an organic isocyanate compound having at least two isocyanate groups in the molecule, the amount of said organic isocyanate compound being 0.5 to 5 parts by weight based on 100 parts by weight of the total amount of the compounds (A) and (B).

7 Claims, No Drawings

HEAT-RESISTANT RESIN COMPOSITION

This application is a continuation-in-part of Ser. No. 07/804,915 filed Dec. 11, 1991, now abandoned.

DETAILED DESCRIPTION OF THE INVENTION

The present invention relates to a heat-resistant resin composition. More specifically, it relates to a heat-resistant resin composition which is excellent not only in heat resistance but also in melt flowability and mechanical strength.

Polyamideimide resins are inferior in melt flowability although these are plastic materials excellent in heat resistance, mechanical strength, electric characteristics and chemical resistance. Most of polyamideimide resins are hard to mold by injection molding, and it is general practice at present to employ a compression molding method.

Meanwhile, a polyphenylene sulfide resin has features that it is excellent in heat resistance, electric characteristics and solvent resistance, particularly in melt flowability. However, it has a defect that it is brittle.

Japanese Patent Publication No. 9754/1982 discloses a resin composition obtained by mixing 70 to 99.9 parts by weight of a polyamideimide resin and 30 to 0.1 part by weight of a polyphenylene sulfide resin by melting them under heat.

The above Japanese Patent Publication describes that the said resin composition containing a polyphenylene sulfide resin shows improvement in the melt processability of the polyamideimide resin.

On the other hand, although having high heat resistance of the polyamideimide resin, the above resin composition has a defect that it shows a decrease in mechanical strength due to the brittleness of the polyphenylene sulfide resin. That is, a decrease in mechanical strength is observed regardless of an amount of a polyphenylene sulfide resin used. In particular, when the amount of a polyphenylene sulfide resin exceeds 30% by weight, the above resin composition shows an extraordinary decrease in mechanical strength and cannot retain mechanical strength required of plastic materials.

It is an object of the present invention to provide a heat-resistant resin composition.

It is another object of the present invention to provide a heat-resistant resin composition having well-balanced properties among heat resistance, mechanical strength and flowability.

Other objects and advantages as well as the above objects and advantages of the present invention will be apparent from the following description.

According to the present invention, the above objects and advantages of the present invention are achieved by a heat-resistant resin composition comprising a melt-kneaded product of:

(A) at least one member selected from the group consisting of a polyamideimide resin precursor composed mainly of a recurring unit of the formula (1)-a,

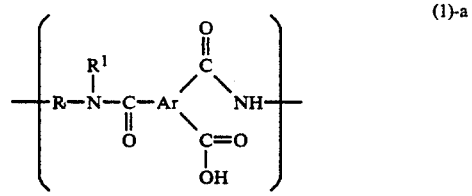

wherein R is a divalent aromatic group or aliphatic group, $R^1$ is a hydrogen atom, an alkyl group or a phenyl group, and Ar is a trivalent aromatic group composed of at least one six-membered ring, and a polyamideimide resin composed mainly of a recurring unit of the formula (1)-b,

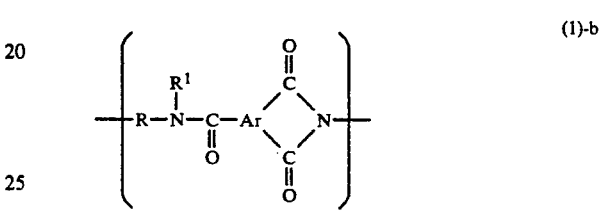

wherein R, $R^1$ and Ar are as defined in the above formula (1)-a, (B) a polyphenylene sulfide resin, and (C) an organic isocyanate compound having at least two isocyanate groups in the molecule, the amount of said organic isocyanate compound being 0.5 to 5 parts by weight based on 100 parts by weight of the total amount of the components (A) and (B).

The above resin composition of the present invention makes it possible to prevent a decrease in mechanical strength which occurs when a polyphenylene sulfide resin is incorporated for the purpose of improving the melt flowability of a polyamideimide resin. In particular, a composition containing 30% by weight or more of a polyphenylene sulfide resin can be also improved in mechanical strength. According to the present invention, therefore, it is possible to provide, as a novel material, a resin composition which contains a high content of a polyphenylene sulfide resin, i.e., has excellent flowability and which further has improved mechanical strength.

The component (A) constituting the resin composition of the present invention contains one or both of the polyamideimide resin precursor and the polyamideimide resin as described above.

The polyamideimide resin precursor is composed mainly of the recurring unit of the above formula (1)-a. That is, the polyamideimide resin precursor used in the present invention may be composed of the recurring unit of the above formula (1)-a alone or may be composed of not less than 50 mol % of the recurring unit of the above formula (1)-a and not more than 50 mol % of other recurring unit(s). The recurring unit of the above formula (1)-a preferably makes up 70 to 100 mol %, more preferably nearly 100 mol %.

In the formula (1)-a, R is a divalent aromatic group or aliphatic group.

Examples of the divalent aromatic group are

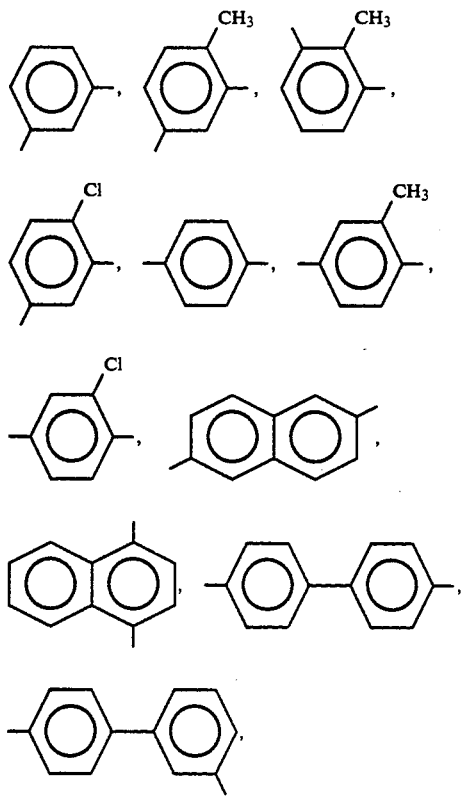
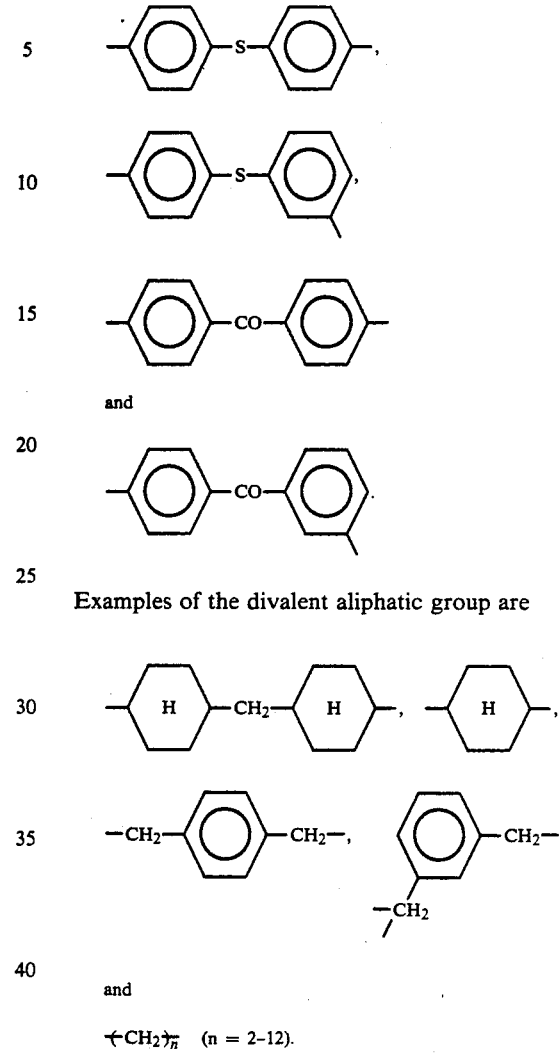
Examples of the divalent aliphatic group are
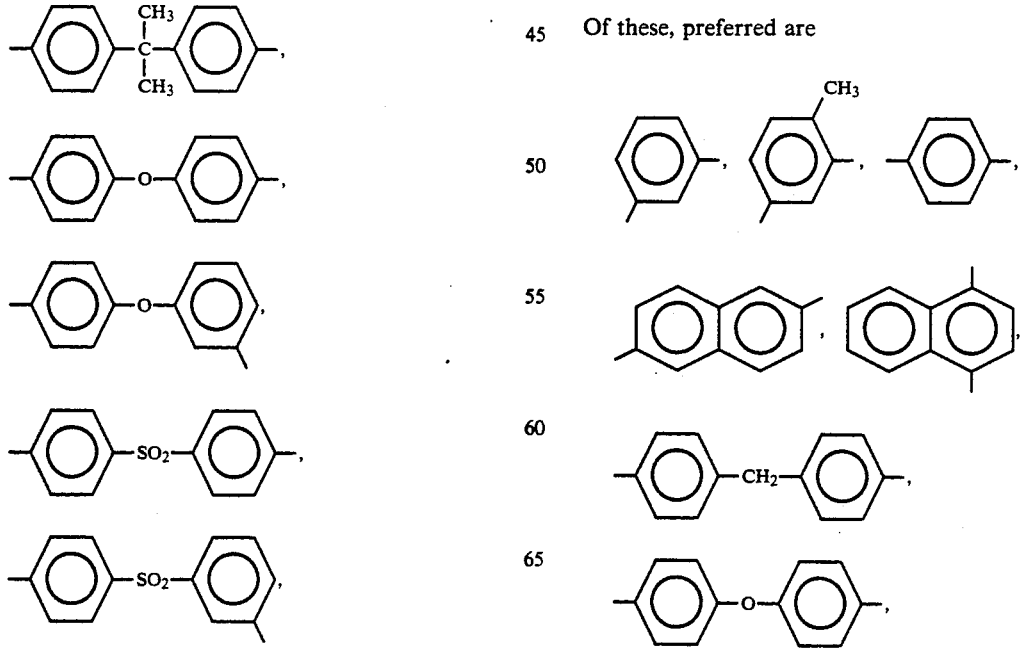
and
$+CH_2\rangle_n$ (n = 2-12).
Of these, preferred are -continued

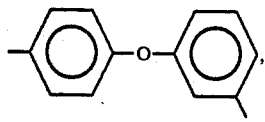

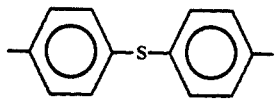

and

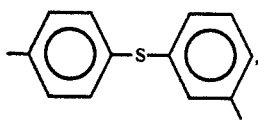

and more preferred are

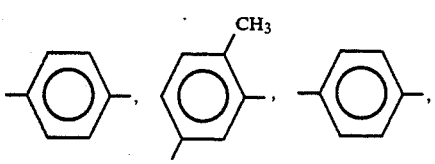

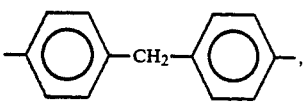

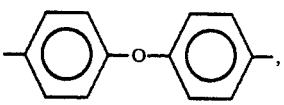

and

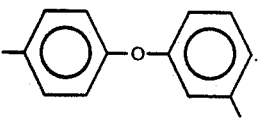

Particularly preferred are

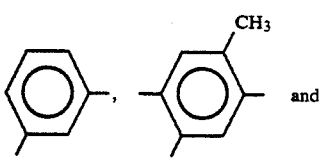

and

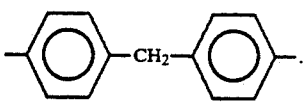

In the formula (1)-a, $R^1$ is a hydrogen atom, an alkyl group or a phenyl group. The alkyl group may be linear or branched. Examples of the alkyl group are preferably those having 1 to 3 carbon atoms such as methyl, ethyl and propyl.

In the formula (1)-a, examples of Ar are

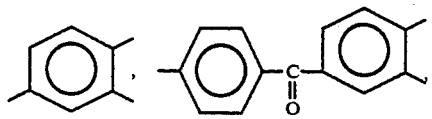

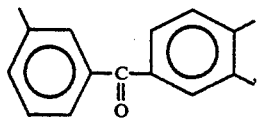

and

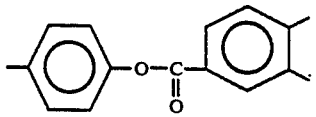

Of these, particularly preferred is

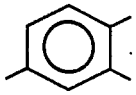

Specific examples of the recurring unit of the above formula (1)-are clearly understood from the above specific examples of R, $R^1$ and Ar.

The polyamideimide resin precursor used in the present invention may be composed of a combination of the recurring unit of the formula (1)-a and other recurring unit(s). Examples of the other recurring unit(s) are preferably the recurring unit of the above formula (1)-b, a recurring unit of the formula (2),

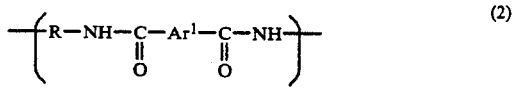

wherein R is as defined above and $Ar^1$ is a divalent aromatic group composed of at least one six-membered ring or an aliphatic group, a recurring unit of the formula (3),

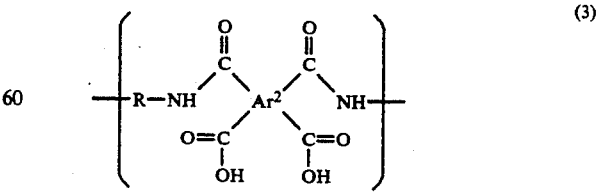

wherein R is as defined above and $Ar^2$ is a tetravalent aromatic group formed of at least one six-membered ring, and a recurring unit of the formula (4),

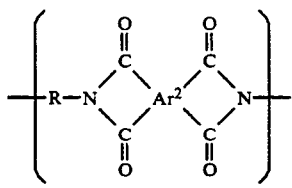

wherein R and Ar² are as defined above.

The other recurring units above are contained preferably in an amount of not more than 30 mol %.

Specific examples of R, R¹ and Ar in the formula (1)-b are as described concerning the formula (1)-a.

Examples of Ar¹ in the formula (2) are preferably

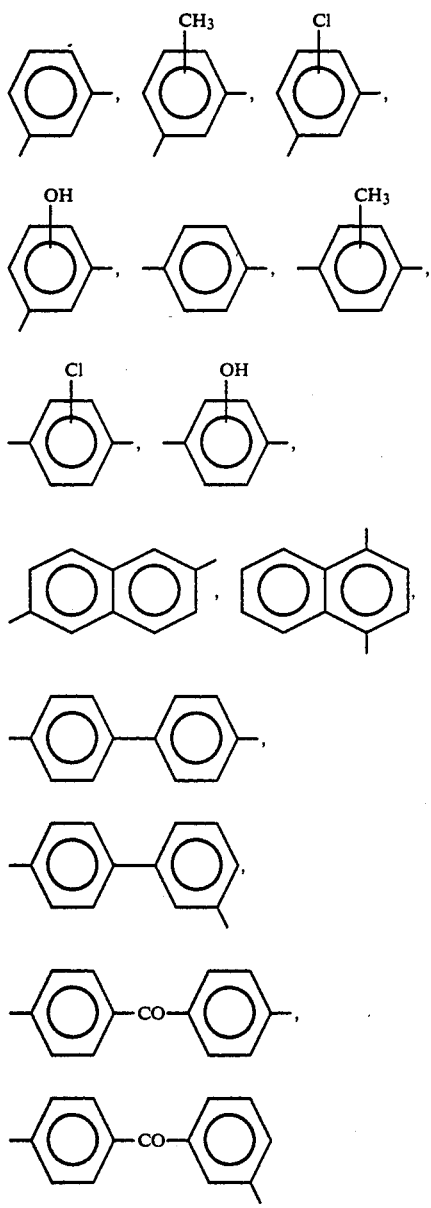

and $+CH_2+_n$ (n = 2-12).

Examples of Ar² in the formulae (3) and (4) are preferably

Specific examples of the other recurring units of the formulae (1)-b, (2), (3) and (4) will be clearly understood from the above specific examples.

The polyamideimide resin precursor used in the present invention may contain one or more recurring units of the formula (1)-a. Similarly, the polyamideimide resin precursor used in the present invention may contain one or more recurring units of the formula (1)-b, one or more recurring units of the formula (2), one or more recurring units of the formula (3) and one or more recurring units of the formula (4).

The above polyamideimide resin precursor can be produced by a known method, e.g., a method disclosed in Japanese Patent Publications Nos. 15637/1967 and 15513/1971. For example, it can be produced by reacting at least one aromatic tricarboxylic acid anhydride monochloride of the formula (5),

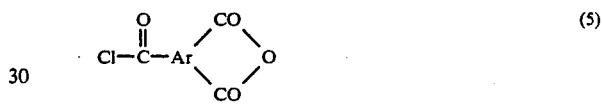

wherein Ar is as defined above, with at least one diamines of the formula (6), $$NH_2-R-NH_2 \qquad (6)$$

wherein R is as defined above, optionally together with a dicarboxylic acid dichloride of the formula (7),

wherein Ar¹ is as defined above, and/or an aromatic tetracarboxylic acid anhydride of the formula (8),

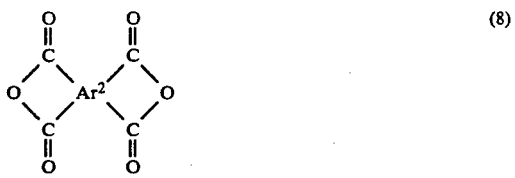

wherein Ar² is as defined above, in a mixed solvent containing water and a nonbasic organic solvent miscible with water in the presence of an acceptor for hydrogen chloride to be formed as a by-product.

The acceptor for hydrogen chloride is preferably selected, for example, from triethylamine and sodium hydroxide. The nonbasic organic solvent is preferably selected, for example, from acetone, methyl ethyl ketone, tetrahydrofuran and dioxane.

Further, the component (A) constituting the resin composition of the present invention may be a polyamideimide resin.

The polyamideimide resin may be composed of a recurring unit of the above formula (1)-b alone or not less than 50 mol % of a recurring unit of the formula (1)-b and not more than 50 mol % of other recurring unit(s).

The recurring unit of the formula (1)-b preferably makes up 70 to 100 mol %, more preferably nearly 100 mol %.

In the formula (1)-b, R, $R^1$ and Ar are as defined in the above formula (1)-a. Specific examples thereof are also as described concerning the formula (1)-a.

Specific examples of the recurring unit of the formula (1)-b will accordingly be clearly understood from the specific examples of R, $R^1$ and Ar.

The polyamideimide resin used in the present invention may be composed of a combination of the recurring unit of the formula (1)-b and other recurring unit(s). Examples of the other recurring unit(s) are preferably a recurring unit of the formula (1)-a, a recurring unit of the formula (2), a recurring unit of the formula (3) and a recurring unit of the formula (4).

The other recurring unit(s) above is(are) contained in an amount of not more than 50 mol % (or less than 50 mol % when the recurring unit of the formula (1)-a alone is contained as other recurring unit in view of avoiding duplication of the polyamideimide resin precursor), preferably not more than 30 mol %.

Specific examples of the other recurring units of the formulae (1)-a, (2), (3) and (4) will be clearly understood from the above specific examples.

The polyamideimide resin used in the present invention may contain one or more recurring units of the formula (1)-b. Similarly, the polyamideimide resin used in the present invention may contain one or more recurring units of the formula (1)-a, one or more recurring units of the formula (2), one or more recurring units of the formula (3) and one or more recurring units of the formula (4).

The above polyamideimide resin can be produced by a known method, e.g., methods disclosed in Japanese Patent Publications Nos. 8910/1965, 19274/1969, 15637/1967, 15513/1971 and 4077/1974 and Japanese Laid-Open Patent Publication No. 180532/1983 and Japanese Patent Publications Nos. 33120/1975, 2397/1970 and 16171/1981.

For example, the above polyamideimide resin can be produced by reacting at least one aromatic tricarboxylic acid anhydride monochloride of the above formula (5) with at least one diamine of the above formula (6) optionally together with a dicarboxylic acid dichloride of the above formula (7) and/or an aromatic tetracarboxylic acid anhydride of the above formula (8) (a) in a polar solvent such as N-methylpyrrolidone, dimethylformamide, dimethylacetamide or cresol in the presence or absence of an acceptor for hydrogen chloride formed as a by-product, or (b) in a mixed solvent containing water and a nonbasic organic solvent miscible with water such as acetone, methyl ethyl ketone, tetrahydrofuran or dioxane in the presence of an acceptor for hydrogen chloride formed as a by-product such as triethylamine or sodium hydroxide.

Another method is also available, in which, for example, at least one aromatic tricarboxylic acid anhydride of the formula (9),

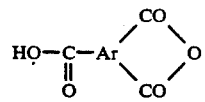

wherein Ar is as defined in the formula (1)-a, and at least one diisocyanate of the formula (10),

wherein R is as defined in the formula (1)-a, are reacted with each other optionally together with a dicarboxylic acid of the formula (11),

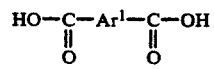

wherein $Ar^1$ is as defined in the formula (2), and/or an aromatic tetracarboxylic acid anhydride of the above formula (8) in the above polar solvent such as N-methylpyrrolidone or in the absence of a solvent. In this method, a diamine may be used in the presence or absence of a dehydrating catalyst as a substitute for the diisocyanate (direct polymerization method).

In any of the above methods, the formed product can be treated under heat in order to convert the amic acid structure to an imide ring.

In the resin composition of the present invention, the component (A) is at least one member selected from the group consisting of the above polyamideimide resin precursor and the above polyamideimide resin.

The component (B) constituting the resin composition of the present invention is a polyphenylene sulfide resin.

For example, the polyphenylene sulfide resin (to be sometimes simplified as "polyphenylene sulfide" hereinafter) advantageously contains at least 70 mol %, preferably at least 90 mol %, of a recurring unit of the formula (12),

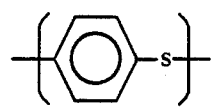

Examples of the recurring unit other than the recurring unit of the formula (12) are preferably a recurring unit of the formula (13),

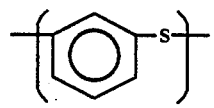

a recurring ether unit for the formula (14),

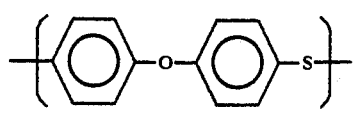

a recurring sulfone unit of the formula (15),

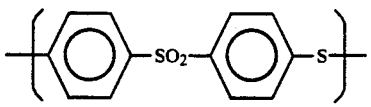

a recurring biphenyl unit of the formula (16),

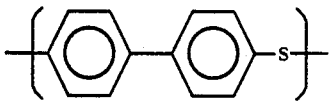

a recurring amino group-substituted phenyl sulfide unit of the formula (17),

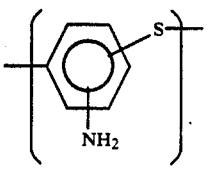

a recurring carboxyl group-substituted phenyl sulfide unit of the formula (18),

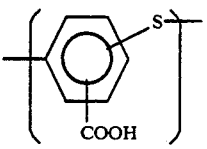

a recurring alkyl-substituted, nitro-substituted, phenyl-substituted or alkoxy-substituted phenyl sulfide unit similar to the above, and a recurring trivalent phenyl sulfide unit.

The SH terminal group concentration of the above polyphenylene sulfide does not constitute an important factor. However, under some compositional and kneading conditions, a polyphenylene sulfide having an SH terminal group concentration of 10 mg or more equivalent weight per kg of the resin sometimes gives a favorable effect, and that having an SH terminal group concentration of 20 mg or more equivalent weight further gives a more favorable effect.

The polyphenylene sulfide can be produced by a variety of known polymerization methods. For example, preferred is a method in which starting materials such as sodium sulfide and p-dichlorobenzene are reacted in an amide-based solvent such as N-methylpyrrolidone or dimethylacetamide or in a sulfone-based solvent such as sulforane. In this reaction, it is preferred to add an alkyl metal carboxylic acid salt such as sodium acetate or lithium acetate thereby to adjust the polymerization degree.

Further, the SH group can be easily introduced to the terminal of the polyphenylene sulfide, for example, by treating the polyphenylene sulfide with hydrochloric acid or acetic acid at a final stage of the polyphenylene sulfide production, or by treating purified polyphenylene sulfide with hydrochloric acid, acetic acid in acetone.

In the resin composition of the present invention, the above polyphenylene sulfides may be used alone or in combination of two or more as a component (B).

The organic isocyanate compound having at least two isocyanate groups in the molecule, used as a component (C) in the present invention, is a generic term for compounds in which at least two isocyanate groups are bonded to an aromatic or aliphatic group.

Examples of such compounds are aromatic polyisocyanates such as 2,4-tolylene diisocyanate, 2,6-tolylene diisocyanate, 1,4-naphthalene diisocyanate, 1,5-naphthalene diisocyanate, 2,6-naphthalene diisocyanate, 1,3-phenylene diisocyanate, 1,4-phenylene diisocyanate, 4,4'-diphenylmethane diisocyanate, 2,2'-dimethyldiphenylmethane-4,4'-diisocyanate, 3,3'-dimethyldiphenylmethane-4,4'-diisocyanate, 4,4'-biphenyl diisocyanate, 2,4'-biphenyl diisocyanate, 3,3'-dimethylbiphenyl-4,4'-diisocyanate, 4,4'-diphenylether diisocyanate, 4,4'-diphenylsulfone diisocyanate and triphenylmethane triisocyanate; aliphatic polyisocyanates such as hexamethylene diisocyanate, 2,4,4-trimethylhexamethylene diisocyanate, 2,2,4-trimethylhexamethylene diisocyanate, dicyclohexylmethane-4,4'-diisocyanate, xylylene diisocyanate, bis(isocyanatemethyl)cyclohexane and 3-isocyanatemethyl-3,5,5-trimethylcyclohexyl isocyanate or isothiocyanates corresponding to these; adducts of polyhydric alcohol with the above aromatic or aliphatic polyisocyanates; adducts of water with the aromatic or aliphatic polyisocyanates; adducts of amines with the aromatic or aliphatic polyisocyanates; and isocyanurate products obtained by modifying the aromatic or aliphatic polyisocyanates.

Of the above compounds, aromatic diisocyanates are preferred. More preferred are 2,4-tolylene diisocyanate, 2,6-tolylene diisocyanate, 1,3-phenylene diisocyanate, 1,4-phenylene diisocyanate, 4,4'-diphenylmethane diisocyanate, 4,4'-biphenyl diisocyanate and 4,4'-diphenylether diisocyanate. Particularly preferred are 2,4-tolylene diisocyanate, 2,6-tolylene diisocyanate and 4,4'-diphenylmethane diisocyanate.

In the resin composition of the present invention, the above organic isocyanate compounds (C) may be used alone or in combination.

In the resin composition of the present invention, the amount of the component (A) based on the total amount of the components (A) and (B) is 5 to 95% by weight, and the amount of the component (B) based on the same basis is 5 to 95% by weight. When the amount of the component (A) or (B) is more than the above upper limit, the resultant resin composition is liable to show a decrease in flowability, heat resistance or mechanical properties.

The amount of the component (A) based on the above basis is preferably 20 to 70% by weight, and the amount of the component (B) on the same basis is preferably 30 to 80% by weight.

The amount of the component (A) based on the above basis is particularly preferably 20 to 65% by weight, and the amount of the component (B) on the same basis is particularly preferably 35 to 80% by weight.

The amount of the component (C) per 100 parts by weight of the total amount of the components (A) and (B) is 0.5 to 5 parts by weight. When the amount of the component (C) is less than the above lower limit, the effect on improvement of the resin composition in mechanical properties, especially tensile strength, is insufficient. When it exceeds the above upper limit, the flowability of the resin composition is insufficient. The amount of the component (C) based on the above basis is more preferably 1 to 5 parts by weight, particularly preferably 1 to 3 parts by weight.

The method of compounding the above components for the resin composition of the present invention is not specially limited. For example, the compounding is carried out by a method in which all the components are mixed in one lot, and melted and kneaded together; by a method in which the component (A) such as a polyamideimide resin precursor, etc. and the polyphenylene sulfide resin (B) are melted and kneaded together, then the component (C) is added and the resultant mixture is again kneaded; or by a method in which the polyphenylene sulfide resin (B) and the component (C) are melted and kneaded together, then the component (A) such as a polyamideimide resin precursor, etc., is added and then the resultant mixture is again kneaded. In particular, when the component (A) is a polyamideimide resin precursor, it is preferred to employ a method in which the polyamideimide resin precursor and the polyphenylene sulfide resin (B) are melted and kneaded together, then the component (C) is added and the resultant mixture is again kneaded.

When the kneading is carried out with an extruder, it is advantageous to employ a method in which the polyamideimide resin precursor and the polyphenylene sulfide resin are fed through a first feed port, and the component (C) is incorporated through a second feed port provided to a zone where the above two components are in a well-kneaded state.

The temperature for the melting and kneading is preferably between 250° C. and 400° C., more preferably between 300° C. and 380° C.

The kneading can be carried out, for example, with an extruder, a kneader, a Banbury mixer, rolls, or the like.

The resin composition of the present invention is produced by melting and kneading those components as described above. When the component (A) is the polyamideimide resin precursor, it is considered that the polyamideimide resin precursor is converted to a polyamideimide resin by forming imide rings as a result of ring-closure of most of the amic acid bonds during the kneading. It is preferred to employ a method in which water formed during this step is removed through a vent hole under reduced pressure.

The resin composition of the present invention may properly contain other resin; an elastomer; a variety of additives such as a flame retardant, a flame retardant synergist, a stabilizer, an ultraviolet light absorber and plasticizer; and other components such as a pigment, a filler, etc., as required.

Examples of the above "other resin" are aliphatic and aromatic polyamides, aliphatic and aromatic polyesters, polycarbonate, polysulfone, polyethersulfone, polyetherimide, polyether ketone, polyether ether ketone and polyimide.

Examples of the above elastomer are polysulfide rubber, polyester elastomer, polyamide elastomer, polyesteramide elastomer and silicon rubber.

Examples of a variety of the additives are as follows. The flame retardant is selected from phosphate esters such as triphenyl phosphate and tricresyl phosphate; brominated compounds typified by decabromobiphenyl, pentabromotoluene, decabromobiphenyl ether, hexabromobenzene and brominated polystyrene; nitrogen-containing compounds such as a melamine derivative; and nitrogen-containing phosphorus compounds such as a cyclic phosphazen compound and a phosphazen polymer. The flame retardant synergist is selected from compounds of antimony, boron, zinc and iron.

The other additive is selected from stabilizers such as steric hindered phenol or phosphite compounds; and ultraviolet light absorbers such as oxalic acid diamide compounds and steric hindered amine compounds.

Further, examples of the other components are pigments such as titanium oxide, zinc sulfide and zinc oxide; mineral fillers typified by glass beads, wollastonite, mica, talc, clay, calcium carbonate, magnesium hydroxide, silica, diatomaceous earth, graphite, carborundum and molybdenum disulfide; fillers of inorganic fibers such as glass fibers, milled fibers, boron fibers, silicon carbide fibers, carbon whiskers, asbestos fibers, asbestos, rock wool, potassium titanate fibers and fibers of brass, aluminum and zinc; fillers of organic fibers typified by carbon fibers and aramid fibers; and flakes of aluminum and zinc. These fillers are used preferably in an amount of 1 to 50% by weight based on the total weight of the resin composition.

As a filler, preferred are glass beads having an average particle diameter of 4.5 to 50 $\mu$m, a glass fiber having an average length of 1.5 to 50 mm and an average diameter of 6 to 20 $\mu$m, and a milled fiber having an average length of 30 to 300 $\mu$m. These fillers may be used as a mixture.

The resin composition of the present invention is not only excellent in heat resistance and melt flowability but also excellent in mechanical strength. These excellent properties are considered to be exhibited by copolymerization between either the polyamideimide resin precursor or the polyamideimide resin and the polyphenylene sulfide resin under a chemical action of the component (C) when these components are melted and kneaded.

The resin composition of the present invention will be detailed further hereinafter by reference to Examples and Comparative Examples.

EXAMPLES 1-3

(1) Preparation of polyamideimide resin precursor:

432.6 Grams of m-phenylenediamine and 445.3 g of triethylamine were dissolved in a mixed solvent consisting of 12.8 lit. of acetone and 5.4 lit. of water. While the resultant mixture was vigorously agitated in a 50 lit. reactor equipped with an agitator, a solution of 842.0 g of trimellitic anhydride monochloride in 5.2 lit. of acetone was added thereto at once, and the resultant mixture was further agitated for 20 minutes to carry out polymerization. After the polymerization, a polymer precipitated was recovered by filtration under suction, and further redispersed in methanol to wash it fully. Then the polymer was recovered by filtration and dried at 50° C. under reduced pressure to give a polyamideimide resin precursor.

The above-obtained polyamideimide resin precursor was measured for a reduced viscosity in a dimethylformamide solution (concentration 1.0 g/dl) at 30° C. to show 0.32 dl/g.

Further, the polyamideimide resin precursor was analyzed on the proportions of an amic acid bond and an imide bond, on the basis of absorption of an imide group at 1,780 cm$^{-1}$ and absorption of an amide group at 1,525 cm$^{-1}$ according to an infrared method, to show 10% of imide rings formed as a result of ring closure of the amic acids and 90% of remaining amic acid bonds.

(2) The polyamideimide resin precursor prepared in the above (1) (to be referred to as "precursor A" hereinafter) and a polyphenylene sulfide resin (trade name T-4, supplied by Tohprene K. K.) were blended in amounts shown in Table 1, and the resultant blend was melted and kneaded in a twin-screw extruder at 360° C. to obtain pellets. Further, 4,4'-diphenylmethane diisocyanate in an amount shown in Table 1 was blended with the pellets, and the resultant blend was again melted and kneaded, and re-extruded in a twin-screw extruder at 360° C. to prepare pellets of a resin composition. The pellets were injection-molded to give dumb- (2) Examples 1 to 3 were repeated except that the polyamideimide resin precursor obtained in Example 1 (1) was replaced with the polyamideimide resin precursor obtained in the above (1) (to be referred to as "precursor B" hereinafter). Table 2 shows the results.

COMPARATIVE EXAMPLES 4-6

Comparative Examples 1-3 were repeated except that the polyamideimide resin precursor in Example 1 (1) was replaced with the same polyamideimide resin precursor as that obtained in Example 4 (1). Table 2 shows the results.

TABLE 2

| | Composition | | | Physical properties | | | |
|---|---|---|---|---|---|---|---|
| | Polyamideimide resin precursor | | Polyphenylene sulfide resin | 4,4'-Diphenyl-methane diisocyanate | Tensile strength | Tensile modulus | Heat distortion temperature 18.6 kg | Melt flow rate 350° C. 60 kg |
| | Kind | Part by weight | Part by weight | Part by weight | (kg/cm$^2$) | (kg/cm$^2$) | (°C.) | (cc/sec) |
| Example 4 | Precursor B | 35 | 65 | 1.5 | 750 | 35000 | 190 | 0.8 |
| Example 5 | Precursor B | 50 | 50 | 1.5 | 850 | 37000 | 217 | 0.08 |
| Example 6 | Precursor B | 65 | 35 | 1.5 | 760 | 38000 | 240 | 0.03 |
| Comp. Example 4 | Precursor B | 35 | 65 | — | 430 | 35000 | 192 | 0.8 |
| Comp. Example 5 | Precursor B | 50 | 50 | — | 470 | 36000 | 220 | 0.09 |
| Comp. Example 6 | Precursor B | 65 | 35 | — | 440 | 39000 | 240 | 0.05 | bell specimens having a thickness of ⅛ inch and transverse test pieces having a thickness of ¼ inch. The dumbbell specimens were measured for a tensile strength and a tensile modulus, the transverse test pieces were measured for a heat distortion temperature (18.6 kg), and the pellets were measured for a melt flow rate under a stress of 60 kg at 350° C. Table 1 shows the results.

Comparative Examples 1-3

Examples 1 to 3 were repeated except that 4,4'-diphenylmethane diisocyanate was not added before the re-extrusion. Table 1 shows the results.

EXAMPLES 7-8

(1) Preparation of polyamideimide resin precursor:

The procedure described in Example 1 (1) was repeated except that 432.6 g of m-phenylenediamine was replaced with 488.7 g of m-tolylenediamine.

The resultant precursor had a reduced viscosity, measured in a dimethylformamide solution (concentration 1.0 g/dl) at 30° C., of 0.34 dl/g and an amic acid bond residual ratio, measured by an infrared method, of 95%.

(2) The procedure of Examples 2 to 3 was repeated except that the polyamideimide resin precursor obtained in Example 1 (1) was replaced with the

TABLE 1

| | Composition | | | Physical properties | | | |
|---|---|---|---|---|---|---|---|
| | Polyamideimide resin precursor | | Polyphenylene sulfide resin | 4,4'-Diphenyl-methane diisocyanate | Tensile strength | Tensile modulus | Heat distortion temperature 18.6 kg | Melt flow rate 350° C. 60 kg |
| | Kind | Part by weight | Part by weight | Part by weight | (kg/cm$^2$) | (kg/cm$^2$) | (°C.) | (cc/sec) |
| Example 1 | Precursor A | 35 | 65 | 1.5 | 700 | 37000 | 208 | 0.8 |
| Example 2 | Precursor A | 50 | 50 | 1.5 | 800 | 38000 | 232 | 0.1 |
| Example 3 | Precursor A | 65 | 35 | 1.5 | 750 | 40000 | 255 | 0.09 |
| Comp. Example 1 | Precursor A | 35 | 65 | — | 400 | 38000 | 212 | 0.9 |
| Comp. Example 2 | Precursor A | 50 | 50 | — | 450 | 39000 | 230 | 0.1 |
| Comp. Example 3 | Precursor A | 65 | 35 | — | 400 | 43000 | 256 | 0.09 |

EXAMPLES 4-6

(1) Preparation of polyamideimide resin precursor:

The procedure described in Example 1 (1) was repeated except that 432.6 g of m-phenylenediamine was replaced with 793.1 g of 4,4'-diaminodiphenylmethane.

The resultant precursor had a reduced viscosity, measured in a dimethylformamide solution (concentration 1.0 g/dl) at 30° C., of 0.39 dl/g and an amic acid bond residual ratio, measured by an infrared method, of 90%.

polyamideimide resin precursor obtained in the above (1) (to be referred to as "precursor C" hereinafter). Table 3 shows the results.

COMPARATIVE EXAMPLES 7-8

The procedure described in Comparative Examples 2 to 3 was repeated except that the polyamideimide resin precursor in Example 1 (1) was replaced with the same polyamideimide resin precursor as that obtained in Example 7 (1). Table 3 shows the results.

TABLE 3

| | Composition | | | Physical properties | | | |
|---|---|---|---|---|---|---|---|
| | Polyamideimide resin precursor | | Polyphenylene sulfide resin | 4,4'-Diphenyl-methane diisocyanate | Tensile strength | Tensile modulus | Heat distortion temperature 18.6 kg | Melt flow rate 350° C. 60 kg |
| | Kind | Part by weight | Part by weight | Part by weight | $(kg/cm^2)$ | $(kg/cm^2)$ | (°C.) | (cc/sec) |
| Example 7 | Precursor C | 50 | 50 | 1.5 | 830 | 38000 | 232 | 0.1 |
| Example 8 | Precursor C | 65 | 35 | 1.5 | 800 | 40000 | 253 | 0.08 |
| Comp. Example 7 | Precursor C | 50 | 50 | — | 440 | 39000 | 230 | 0.1 |
| Comp. Example 8 | Precursor C | 65 | 35 | — | 420 | 42000 | 255 | 0.09 |

EXAMPLES 9-10

(1) Preparation of polyamideimide resin precursor:

The procedure described in Example 1 (1) was repeated except that 432.6 g of m-phenylenediamine was replaced with a mixture of 216.3 g of m-phenylenediamine and 396.5 g of diaminodiphenylmethane.

The resultant precursor had a reduced viscosity, measured in a dimethylformamide solution (concentration 1.0 g/dl) at 30° C., of 0.36 dl/g and an amic acid bond residual ratio, measured by an infrared method, of 90%.

(2) The procedure described in Examples 2 to 3 was repeated except that the polyamideimide resin precursor obtained in Example 1 (1) was replaced with the polyamideimide resin precursor obtained in the above (1) (to be referred to as "precursor D" hereinafter). Table 4 shows the results.

COMPARATIVE EXAMPLES 9-10

The procedure of Comparative Examples 2 to 3 was repeated except that the polyamideimide resin precursor in Example 1 (1) was replaced with the same polyamideimide resin precursor as that obtained in Example 9 (1). Table 4 shows the results.

EXAMPLES 11-12

(1) Preparation of polyamideimide resin precursor:

The procedure described in Example 1 (1) was repeated by the use of a mixture of 480.6 g of 4,4'-diaminodiphenyl ether with 173.0 g of m-phenylenediamine as a diamine component and a mixture of 505.2 g of trimellitic anhydride monochloride with 324.8 g of isophthalic acid dichloride as an acid component.

The resultant precursor had a reduced viscosity, measured in a dimethylformamide solution (concentration 1.0 g/dl) at 30° C., of 0.35 dl/g and an amic acid bond residual ratio, measured by an infrared method, of 90%.

(2) The procedure described in Examples 2 to 3 was repeated except that the polyamideimide resin precursor obtained in Example 1 (1) was replaced with the polyamideimide resin precursor obtained in the above (1) (to be referred to as "precursor E" hereinafter). Table 5 shows the results.

COMPARATIVE EXAMPLES 11-12

The procedure of Comparative Examples 2 to 3 was repeated except that the polyamideimide resin precursor in Example 1 (1) was replaced with the same polyamideimide resin precursor as that obtained in Example 11 (1). Table 5 shows the results.

TABLE 5

| | Composition | | | Physical properties | | | |
|---|---|---|---|---|---|---|---|
| | Polyamideimide resin precursor | | Polyphenylene sulfide resin | 4,4'-Diphenyl-methane diisocyanate | Tensile strength | Tensile modulus | Heat distortion temperature 18.6 kg | Melt flow rate 350° C. 60 kg |
| | Kind | Part by weight | Part by weight | Part by weight | $(kg/cm^2)$ | $(kg/cm^2)$ | (°C.) | (cc/sec) |
| Example 11 | Precursor E | 50 | 50 | 1.5 | 730 | 34000 | 198 | 0.4 |
| Example 12 | Precursor E | 65 | 35 | 1.5 | 680 | 35000 | 210 | 0.2 |
| Comp. Example 11 | Precursor E | 50 | 50 | — | 420 | 35000 | 190 | 0.5 |
| Comp. Example 12 | Precursor E | 65 | 35 | — | 400 | 36000 | 210 | 0.2 |

EXAMPLES 13-15

(1) Preparation of polyamideimide resin:

432.6 Grams of m-phenylenediamine and 445.3 g of triethylamine were dissolved in a mixed solvent consisting of 12.8 lit. of acetone and 5.4 lit. of water. While the resultant mixture was vigorously agitated in a 50 lit. reactor equipped with an agitator, a solution of 842.0 g of trimellitic anhydride monochloride in 5.2 lit. of ace-

TABLE 4

| | Composition | | | Physical properties | | | |
|---|---|---|---|---|---|---|---|
| | Polyamideimide resin precursor | | Polyphenylene sulfide resin | 4,4'-Diphenyl-methane diisocyanate | Tensile strength | Tensile modulus | Heat distortion temperature 18.6 kg | Melt flow rate 350° C. 60 kg |
| | Kind | Part by weight | Part by weight | Part by weight | $(kg/cm^2)$ | $(kg/cm^2)$ | (°C.) | (cc/sec) |
| Example 9 | Precursor D | 50 | 50 | 1.5 | 820 | 38000 | 220 | 0.09 |
| Example 10 | Precursor D | 65 | 35 | 1.5 | 780 | 39000 | 245 | 0.06 |
| Comp. Example 9 | Precursor D | 50 | 50 | — | 460 | 39000 | 223 | 0.09 |
| Comp. Example 10 | Precursor D | 65 | 35 | — | 420 | 40000 | 250 | 0.07 | tone was added thereto at once, and the resultant mixture was agitated for 20 minutes to carry out polymerization. After the polymerization, a polymer precipitated was recovered by filtration under suction, and further redispersed in methanol to wash it fully. Then the polymer was recovered by filtration and dried at 50° C. under reduced pressure to give a polyamideimide resin precursor. The above-obtained polyamideimide resin precursor was measured for a reduced viscosity in a dimethylformamide solution (concentration 1.0 g/dl) at 30° C. to show 0.32 dl/g. This precursor was further subjected to heat treatment at 150° C. for 15 hours to give a polyamideimide resin.

Further, the polyamideimide resin was analyzed on the proportions of an amic acid bond and an imide bond, on the basis of absorption of an imide group at 1,780 cm$^{-1}$ and absorption of an amide group at 1,525 cm$^{-1}$ according to an infrared method, to show about 50% of imide ring structures.

(2) The polyamideimide resin prepared in the above (1) (to be referred to as "resin A" hereinafter) and a polyphenylene sulfide resin (trade name T-4, supplied by Tohprene K.K.) were blended in amounts shown in Table 6, and the resultant blend was melted and kneaded in a twin-screw extruder at 360° C. to obtain pellets. Further, 4,4'-diphenylmethane diisocyanate in an amount shown in Table 6 was blended with the pellets, and the resultant blend was again melted and kneaded, and re-extruded in a twin-screw extruder at 360° C. to prepare pellets of a resin composition. The pellets were injection-molded to give dumbbell specimens having a thickness of ⅛ inch and transverse test pieces having a thickness of ⅛ inch. The dumbbell specimens were measured for a tensile strength and a tensile modulus, the transverse test pieces were measured for a heat distortion temperature (18.6 kg), and the pellets were measured for a melt flow rate under a stress of 60 kg at 350° C. Table 6 shows the results.

COMPARATIVE EXAMPLES 13–15

Examples 13 to 15 were repeated except that 4,4'-diphenylmethane diisocyanate was not added before the re-extrusion. Table 6 shows the results.

TABLE 6

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm$^2$) | (kg/cm$^2$) | (°C.) | (cc/sec) |
| Example 13 | Resin A | 35 | 65 | MDI* | 2.5 | 680 | 37000 | 210 | 0.4 |
| Example 14 | Resin A | 50 | 50 | MDI | 2.5 | 750 | 38000 | 235 | 0.06 |
| Example 15 | Resin A | 65 | 35 | MDI | 2.5 | 700 | 39000 | 260 | 0.05 |
| Comp. Example 13 | Resin A | 35 | 65 | — | — | 260 | 38000 | 214 | 0.5 |
| Comp. Example 14 | Resin A | 50 | 50 | — | — | 350 | 40000 | 233 | 0.06 |
| Comp. Example 15 | Resin A | 65 | 35 | — | — | 330 | 41000 | 260 | 0.04 |

*MDI: 4,4'-diphenylmethane diisocyanate

EXAMPLES 16–18

(1) Preparation of polyamideimide resin:

The procedure described in Example 13 (1) was repeated except that 432.6 g of m-phenylenediamine was replaced with 793.1 g of 4,4'-diaminodiphenylmethane.

The resultant precursor had a reduced viscosity of 0.39 dl/g and an amic acid bond residual ratio, measured by an infrared method after the heat treatment, of about 50%.

(2) The procedure described in Examples 13 to 15 was repeated except that the polyamideimide resin obtained in Example 13 (1) was replaced with the polyamideimide resin obtained in the above (1) (to be referred to as "resin B" hereinafter). Table 7 shows the results.

COMPARATIVE EXAMPLES 16–18

The procedure described in Comparative Examples 13 to 15 was repeated except that the polyamideimide resin in Example 13 (1) was replaced with the polyamideimide resin (resin B) obtained in Example 16 (1). Table 7 shows the results.

TABLE 7

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm$^2$) | (kg/cm$^2$) | (°C.) | (cc/sec) |
| Example 16 | Resin B | 35 | 65 | MDI | 2.5 | 680 | 34000 | 192 | 0.5 |
| Example 17 | Resin B | 50 | 50 | MDI | 2.5 | 770 | 35000 | 220 | 0.03 |
| Example 18 | Resin B | 65 | 35 | MDI | 2.5 | 700 | 37000 | 241 | 0.008 |
| Comp. Example 16 | Resin B | 35 | 65 | — | — | 260 | 33000 | 195 | 0.6 |
| Comp. Example 17 | Resin B | 50 | 50 | — | — | 370 | 35000 | 225 | 0.05 |
| Comp. Example 18 | Resin B | 65 | 35 | — | — | 340 | 37000 | 247 | 0.01 |

EXAMPLE 19

(1) Preparation of polyamideimide resin:

750.8 Grams of 4,4'-diphenylmethane diisocyanate and 2.5 lit. of dimethylacetamide were charged into a reactor equipped with an agitator, a nitrogen gas-introducing tube, a thermometer and a condenser, and 576.4 g of trimellitic anhydride dissolved in 2 lit. of dimethylacetamide was added thereto. The resultant mixture was allowed to react between 125° C. and 135° C. for 3 hours, and acetone was used as a nonsolvent to precipitate a polyamideimide resin. The polyamideimide resin was recovered by filtration and dried. The polyamideimide resin had a reduced viscosity of 0.42 dl/g.

(2) The procedure described in Example 15 was repeated except that the polyamideimide resin in Example 13 (1) was replaced with the polyamideimide resin obtained in the above (1) (to be referred to as "resin C" hereinafter). Table 8 shows the results.

COMPARATIVE EXAMPLE 19

The procedure described in Comparative Example 15 was repeated except that the polyamideimide resin in Example 13 (1) was replaced with the polyamideimide resin (resin C) obtained in Example 19 (1). Table 8 shows the results.

EXAMPLES 20–21

(1) Preparation of polyamideimide resin:
The procedure described in Example 13 (1) was repeated except that 432.6 g of m-phenylenediamine was replaced with 488.7 g of m-tolylenediamine. The resultant precursor had a reduced viscosity of 0.34 dl/g, and the resin obtained by subjecting the precursor to heat treatment was measured for a proportion of an imide ring structure by an infrared method to show about 50%.

(2) The procedure described in Examples 14 to 15 was repeated except that the polyamideimide resin in Example 13 (1) was replaced with the polyamideimide resin obtained in the above (1) (to be referred to as "resin D"). Table 8 shows the results.

EXAMPLE 22

The procedure described in Example 15 was repeated except that the polyamideimide resin in Example 13 (1) was replaced with the polyamideimide resin (resin D) obtained in Example 21 (1) and that 2.5 parts by weight of the diphenylmethane diisocyanate was replaced with 3.5 parts by weight of tolylene diisocyanate. Table 8 shows the results.

TABLE 8

| | Composition | | | | | Physical properties | | | |
|---|---|---|---|---|---|---|---|---|---|
| | Polyamideimide resin | | Polyphenylene sulfide resin | Diisocyanate | | Tensile strength (kg/cm²) | Tensile modulus (kg/cm²) | Heat distortion temperature 18.6 kg (°C.) | Melt flow rate 350° C. 60 kg (cc/sec) |
| | Kind | Part by weight | Part by weight | Kind | Part by weight | | | | |
| Example 19 | Resin C | 65 | 35 | MDI | 2.5 | 670 | 38000 | 240 | 0.01 |
| Comp. Example 19 | Resin C | 65 | 35 | — | — | 320 | 37000 | 245 | 0.02 |
| Example 20 | Resin D | 50 | 50 | MDI | 2.5 | 760 | 36000 | 230 | 0.05 |
| Example 21 | Resin D | 65 | 35 | MDI | 2.5 | 700 | 42000 | 252 | 0.03 |
| Example 22 | Resin D | 65 | 35 | TDI* | 3.5 | 680 | 41000 | 255 | 0.03 |

*TDI: tolylene diisocyanate

COMPARATIVE EXAMPLES 20–21

The procedure described in Comparative Examples 14 to 15 was repeated except that the polyamideimide resin in Example 13 (1) was replaced with the polyamideimide resin (resin D) described in Example 21 (1). Table 9 shows the results.

EXAMPLE 23

(1) Preparation of polyamideimide resin:
The procedure described in Example 19 (1) was repeated except that 750.8 g of 4,4'-diphenylmethane diisocyanate was replaced with 522.5 g of tolylene diisocyanate. The resultant polyamideimide resin had a reduced viscosity of 0.32 dl/g.

(2) The procedure described in Example 15 was repeated except that the polyamideimide resin in Example 13 (1) was replaced with the polyamideimide resin obtained in the above (1) (to be referred to as "resin E" hereinafter). Table 9 shows the results.

EXAMPLE 24

The procedure described in Example 15 was repeated except that the polyamideimide resin in Example 13 (1) was replaced with the polyamideimide resin (resin E) obtained in Example 23 (1) and that 2.5 parts by weight of the diphenylmethane diisocyanate was replaced with 3.5 parts by weight of tolylene diisocyanate. Table 9 shows the results.

COMPARATIVE EXAMPLE 22

The procedure described in Comparative Example 15 was repeated except that the polyamideimide resin in Example 13 (1) was replaced with the polyamideimide resin (resin E) obtained in Example 23 (1). Table 9 shows the results.

TABLE 9

| | Composition | | | | | Physical properties | | | |
|---|---|---|---|---|---|---|---|---|---|
| | Polyamideimide resin | | Polyphenylene sulfide resin | Diisocyanate | | Tensile strength (kg/cm²) | Tensile modulus (kg/cm²) | Heat distortion temperature 18.6 kg (°C.) | Melt flow rate 350° C. 60 kg (cc/sec) |
| | Kind | Part by weight | Part by weight | Kind | Part by weight | | | | |
| Comp. Example 20 | Resin D | 50 | 50 | — | — | 270 | 37000 | 233 | 0.07 |
| Comp. Example 21 | Resin D | 65 | 35 | — | — | 360 | 41000 | 258 | 0.04 |

TABLE 9-continued

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm²) | (kg/cm²) | (°C.) | (cc/sec) |
| Example 23 | Resin E | 65 | 35 | TDI | 2.5 | 690 | 43000 | 250 | 0.04 |
| Example 24 | Resin E | 65 | 35 | TDI | 3.5 | 680 | 40000 | 252 | 0.04 |
| Comp. Example 22 | Resin E | 65 | 35 | — | — | 340 | 40000 | 250 | 0.05 |

EXAMPLES 25-26

(1) Preparation of polyamideimide resin:

The procedure described in Example 13 (1) was repeated except that 432.6 g of the m-phenylenediamine was replaced with a mixture consisting of 216.3 g of m-phenylenediamine and 396.5 g of diaminodiphenylmethane. The resultant precursor had a reduced viscosity of 0.36 dl/g. The resin obtained by subjecting the precursor to heat treatment was measured for a proportion of an imide ring structure by an infrared method to show about 50 mol %.

(2) The procedure described in Examples 14 to 15 was repeated except that the polyamideimide resin in Example 13 (1) was replaced with the polyamideimide resin obtained in the above (1) (to be referred to as "resin F"). Table 10 shows the results.

COMPARATIVE EXAMPLES 23-24

The procedure described in Comparative Examples 14 to 15 was repeated except that the polyamideimide resin in Example 13 (1) was replaced with the polyamideimide resin (resin F) obtained in Example 25 (1). Table 10 shows the results.

EXAMPLES 27-28

(1) Preparation of polyamideimide resin:

108.1 Grams of m-phenylenediamine, 384.3 g of trimellitic anhydride and 2.5 lit. of dimethylacetamide were charged into a reactor equipped with an agitator, a nitrogen-introducing tube, a thermometer and a condenser, and the resultant mixture was allowed to react under reflux for 3 hours. The reaction mixture was cooled, and the 250.3 g of 4,4'-diphenylmethane diisocyanate was added thereto. The resultant mixture was allowed to react at 135° C. for 3 hours. The reaction mixture was treated in the same manner as in Example 13 (1) to prepare a polyamideimide resin. The polyamideimide resin had a reduced viscosity of 0.45 dl/g.

(2) The procedure described in Examples 14 to 15 was repeated except that the polyamideimide resin in Example 13 (1) was replaced with the polyamideimide resin obtained in the above (1) (to be referred to as "resin G" hereinafter). Table 11 shows the results.

COMPARATIVE EXAMPLES 25-26

The procedure described in Comparative Example 14 to 15 was repeated except that the polyamideimide resin in Example 13 (1) was replaced with the polyamideimide resin (resin G) obtained in Example 27 (1). Table 11 shows the results.

TABLE 11

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm²) | (kg/cm²) | (°C.) | (cc/sec) |
| Example 27 | Resin G | 50 | 50 | MDI | 2.5 | 710 | 36000 | 220 | 0.05 |
| Example 28 | Resin G | 65 | 35 | MDI | 2.5 | 650 | 41000 | 250 | 0.04 |
| Comp. Example 25 | Resin G | 50 | 50 | — | — | 300 | 36000 | 218 | 0.07 |
| Comp. Example 26 | Resin G | 65 | 35 | — | — | 250 | 40000 | 250 | 0.05 |

TABLE 10

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm²) | (kg/cm²) | (°C.) | (cc/sec) |
| Example 25 | Resin F | 50 | 50 | MDI | 2.5 | 730 | 35000 | 220 | 0.03 |
| Example 26 | Resin F | 65 | 35 | MDI | 2.5 | 680 | 40000 | 250 | 0.02 |
| Comp. Example 23 | Resin F | 50 | 50 | — | — | 330 | 36000 | 225 | 0.05 |
| Comp. Example 24 | Resin F | 65 | 35 | — | — | 300 | 39000 | 252 | 0.04 |

EXAMPLES 29-30

(1) Preparation of polyamideimide resin:

The procedure described in Example 13 (1) was repeated by the use of a mixture of 480.6 g of 4,4'-diaminodiphenyl ether with 173.0 g of m-phenylenediamine as a diamine component and a mixture of 505.2 g of trimellitic anhydride monochloride with 324.8 g of isophthalic acid dichloride as an acid component. The resultant precursor had a reduced viscosity of 0.35 dl/g, and the resin obtained by subjecting the precursor to heat treatment was measured for a proportion of an imide ring structure to show about 30 mol %.

(2) The procedure described in Examples 14 to 15 was repeated except that the polyamideimide resin in Example 13 (1) was replaced with the polyamideimide resin obtained in the above (1) (to be referred to as "resin H" hereinafter). Table 12 shows the results.

COMPARATIVE EXAMPLES 27-28

The procedure of Comparative Examples 14 to 15 was repeated except that the polyamideimide resin precursor in Example 13 (1) was replaced with the polyamideimide resin (resin H) obtained in Example 29 (1). Table 12 shows the results.

TABLE 12

| | Composition | | | | | Physical properties | | | |
|---|---|---|---|---|---|---|---|---|---|
| | Polyamideimide resin | | Polyphenylene sulfide resin | diisocyanate | | Tensile strength | Tensile modulus | Heat distortion Temperature 18.6 kg | Melt flow rate 350° C. 60 kg |
| | Kind | Part by weight | Part by weight | Kind | Part by weight | (kg/cm²) | (kg/cm²) | (°C.) | (cc/sec) |
| Example 29 | Resin H | 50 | 50 | MDI | 2.5 | 700 | 34000 | 196 | 0.1 |
| Example 30 | Resin H | 65 | 35 | MDI | 2.5 | 660 | 37000 | 210 | 0.05 |
| Comp. Example 27 | Resin H | 50 | 50 | — | — | 300 | 35000 | 198 | 0.2 |
| Comp. Example 28 | Resin H | 65 | 35 | — | — | 270 | 37000 | 215 | 0.07 |

EXAMPLES 31-32

(1) Preparation of polyamideimide resin:

480.6 Grams of 4,4'-diaminodiphenyl ether, 173.0 g of m-phenylenediamine and 5 lit. of dimethylacetamide were charged into a reactor equipped with an agitator, a nitrogen-introducing tube, and a thermometer, and 842 g of trimellitic anhydride monochloride was gradually added. Thereafter, the resultant mixture was allowed to stand for 15 hours to finish the reaction. A polymer was obtained in the same manner as in Example 13 (1) by means of acetone as a nonsolvent. The resultant precursor had a reduced viscosity of 0.30 dl/g. The resin obtained by subjecting the precursor to heat treatment was measured for a proportion of an imide ring structure by an infrared method to show about 50 mol %.

(2) The procedure described in Examples 14 to 15 was repeated except that the polyamideimide resin in Example 13 (1) was replaced with the polyamideimide resin obtained in the above (1) (to be referred to as "resin I" hereinafter). Table 13 shows the results.

COMPARATIVE EXAMPLES 29-30

The procedure described in Comparative Examples 14 to 15 was repeated except that the polyamideimide resin in Example 13 (1) was replaced with the polyamideimide resin (resin I) obtained in Example 31 (1). Table 13 shows the results.

TABLE 13

| | Composition | | | | | Physical properties | | | |
|---|---|---|---|---|---|---|---|---|---|
| | Polyamideimide resin | | Polyphenylene sulfide resin | Diisocyanate | | Tensile strength | Tensile modulus | Heat distortion temperature 18.6 kg | Melt flow rate 350° C. 60 kg |
| | Kind | Part by weight | Part by weight | Kind | Part by weight | (kg/cm²) | (kg/cm²) | (°C.) | (cc/sec) |
| Example 31 | Resin I | 50 | 50 | MDI | 2.5 | 730 | 34000 | 210 | 0.08 |
| Example 32 | Resin I | 65 | 35 | MDI | 2.5 | 680 | 40000 | 225 | 0.06 |
| Comp. Example 29 | Resin I | 50 | 50 | — | — | 180 | 35000 | 208 | 0.1 |
| Comp. Example 30 | Resin I | 65 | 35 | — | — | 150 | 38000 | 225 | 0.09 |

EXAMPLES 33 TO 35 AND COMPARATIVE EXAMPLES 31-32

Example 2 was repeated except that the amount of 4,4'-diphenylmethane diisocyanate was changed to those as shown in Table 14 to obtain dumbbell specimens having a thickness of ⅛ inch. The dumbbell specimens were measured for a tensile strength. Table 14 shows the results.

TABLE 14

| | Composition | | | | |
|---|---|---|---|---|---|
| | Polyamideimide resin precursor | | Polyphenylene sulfide resin | 4,4'-Diphenylmethane Diisocyanate | Tensile strength |
| | Kind | Part by weight | Part by weight | Part by weight | (kg/cm²) |
| Example 33 | Precursor A | 50 | 50 | 0.5 | 590 |
| Example 34 | Precursor A | 50 | 50 | 2.5 | 820 |
| Example 35 | Precursor A | 50 | 50 | 5.0 | 620 |
| Comp. | Precursor A | 50 | 50 | 0.1 | 470 |

TABLE 14-continued

| | Composition | | | |
|---|---|---|---|---|
| | Polyamideimide resin precursor | | Polyphenylene sulfide resin | 4,4'-Diphenyl-methane Diisocyanate | Tensile strength (kg/cm²) |
| | Kind | Part by weight | Part by weight | Part by weight | |
| Example 31 Comp. Example 32 | Precursor A | 50 | 50 | 7.0 | 520 |

EXAMPLES 36 TO 38 AND COMPARATIVE EXAMPLES 33-34

Examples 23 was repeated except that 4,4'-diphenylmethane diisocyanate as the diisocyanate component was used in an amount shown in Table 5 to obtain dumbbell specimens having a thickness of ⅛ inch. The dumbbell specimens were measured for a tensile strength. Table 15 shows the results.

TABLE 15

| | Composition | | | | |
|---|---|---|---|---|---|
| | Polyamideimide resin precursor | | Polyphenylene sulfide resin | 4,4'-diphenyl-methane diisocyanate | Tensile strength (kg/cm²) |
| | Kind | Part by weight | Part by weight | Part by weight | |
| Comp. Example 33 | Resin E | 65 | 35 | 0.1 | 350 |
| Example 36 | Resin E | 65 | 35 | 0.5 | 560 |
| Example 37 | Resin E | 65 | 35 | 1.8 | 670 |
| Example 38 | Resin E | 65 | 35 | 5.0 | 610 |
| Comp. Example 34 | Resin E | 65 | 35 | 7.0 | 480 |

What is claimed is:

1. A heat-resistant resin composition consisting essentially of a melt-kneaded product of:

(A) at least one member selected from the group consisting of a polyamideimide resin precursor composed mainly of a recurring unit of the formula (1)-a,

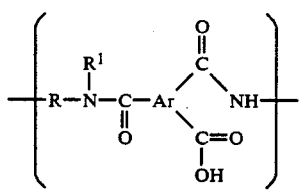

(1)-a wherein R is a divalent aromatic group or aliphatic group, R¹ is a hydrogen atom, an alkyl group or a phenyl group, and Ar is a trivalent aromatic group composed of at least one six-membered ring, and a polyamideimide resin composed mainly of a recurring unit of the formula (1)-b,

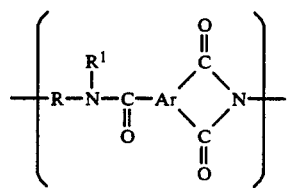

(1)-b wherein R, R¹ and Ar are as defined in the above formula (1)-a, (B) a polyphenylene sulfide resin, and (C) an organic isocyanate compound having at least two isocyanate groups in the molecule, wherein, based on 100 parts by weight of the total amount of the compounds (A) and (B), the amount of said organic isocyanate compound (C) is 0.5 to 5 parts by weight, the amount of the component (A) is 20 to 70 parts by weight and the amount of the component (B) is 30 to 80 parts by weight.

2. The composition of claim 1, wherein the polyamideimide resin precursor contains not less than 50 mol % of the recurring unit of the formula (1)-a.

3. The composition of claim 1, wherein the polyamideimide resin contains not less than 50 mol % of the recurring unit of the formula (1)-b.

4. The composition of claim 1, wherein the polyphenylene sulfide resin contains at least 70 mol % of a recurring unit of the following formula,

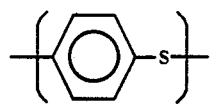

5. The composition of claim 1, wherein the organic isocyanate compound is selected from the group consisting of aromatic polyisocyanate, aliphatic polyisocyanate, an adduct of one of these polyisocyanates with a polyhydric alcohol, an adduct of one of these polyisocyanates with water, an adduct of one of these polyisocyanates with an amine, and an isocyanurate product obtained by modifying one of these polyisocyanates.

6. The composition of claim 1, wherein, based on the total amount of the components (A) and (B), the amount of the component (A) is 20 to 65% by weight and the amount of the component (B) is 35 to 80% by weight.

7. The composition of claim 1, wherein the component (C) is contained in an amount of 1 to 3 parts by weight based on 100 parts by weight of the total amount of the components (A) and (B).

* * * * *